Aug. 19, 1947.   J. F. BUDNICK   2,425,862
SCALE COMPASS
Filed April 17, 1944
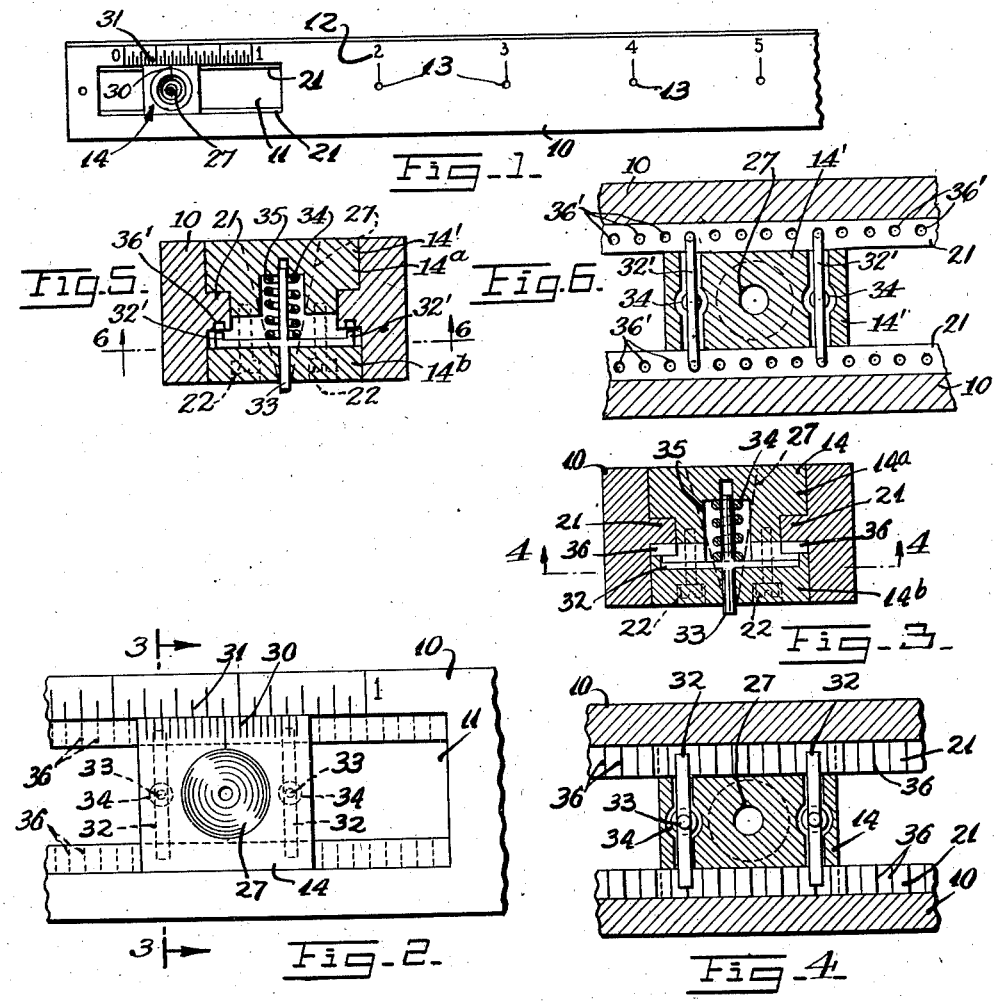
INVENTOR.
Joseph F. Budnick
BY
ATTORNEY Patented Aug. 19, 1947

2,425,862

UNITED STATES PATENT OFFICE 2,425,862

SCALE COMPASS

Joseph F. Budnick, Forest Hills, N. Y.

Application April 17, 1944, Serial No. 531,392

2 Claims. (Cl. 33—27)

This invention relates to new and useful improvements in a scale compass.

More particularly, the invention proposes an improved scale compass characterized by a strip-like body having a slot at one end, and a linear scale along one side and formed with small pencil point openings along each main linear distance on said scale. A slide is proposed mounted in said slot and limited to move one or more main linear distances on said scale and formed with a pencil point opening alignable with subdivisions of the first main linear distance on the scale.

The linear scale mentioned in the previous paragraph may be any cne of the known linear scales. However, for illustrative purposes the inch scale will be disclosed in this specification.

The invention proposes to mount said slide in a specific way so that it maintains positions in which it is set.

It is also contemplated to provide the scale compass with a vernier by which especially accurate circles or arcs may be drawn.

The advantage of the new scale compass over the present "beam" or "trammel" compasses used by machinists, tool makers, carpenters, machine designers and the like, is the extremely low cost of manufacture resulting in the article being one-tenth to one-twentieth in price to a "beam" compass and still efficiently performing its function. The new and improved scale compass consists merely of several small parts added to a slot made in a standard scale or in a special scale.

It is judged that the improved scale compass is simpler to use than other compasses now generally in use, is more compact, has comparable accuracy and should be in use in schools, homes, factories, and is easily within the price range of all.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure—

Fig. 1 is a fragmentary elevational view of a scale compass constructed in accordance with this invention.

Fig. 2 is a fragmentary elevational view of still another compass embodying another form of the invention.

Fig. 3 is a sectional view taken on the line 3—3 of Fig. 2.

Fig. 4 is a fragmentary sectional view taken on the line 4—4 of Fig. 3.

Fig. 5 is a sectional view similar to Fig. 3 but illustrating a modification thereof.

Fig. 6 is a sectional view taken on the line 6—6 of Fig. 5.

The scale compass disclosed in Figs. 1 to 4 includes a strip-like body 10 having a slot 11 at one end and a linear scale 12 along one side. The body 10 is formed with small pencil point openings 13 along each main linear distance on the scale. A slide 14 is mounted in said slot 11 and is limited to move one linear distance on said scale 12 by the length of the slot 11.

In this form of the invention the slide 14 has a conically shaped opening 27 through which the point of a pencil may be engaged. The pencil point may be used as a center for swinging the scale compass. The slide 14 is made from two sections 14$^a$ and 14$^b$ secured together by screws 22.

The slide 14 is provided with a vernier 30 cooperative with a complementary vernier scale 31 formed on the body 10 along the side of the opening 11. The slide 14 is also provided with a pair of clamp bars 32 having stems 33 projecting from the bottom of the slide. These clamp bars 32 are normally urged downwards by expansion springs 34 housed within cavities 35 in the slide 14. The clamp bars 32 are cooperative with serrations or teeth 36 formed on the bottom faces of the tracks 21.

In this form of the invention when the scale compass is pressed down upon a table or sheet of paper the stems 33 will be pressed upwards against the action of the springs 34, causing the clamp bars 32 to enter between the serrations or teeth 36 and fixedly locking the slide 14 from shifting in the slot 11. The scale compass may now be used in a manner identical to that previously described for swinging arcs and circles.

In Figs. 5 and 6 a modified form of the invention has been disclosed which is very similar to the form shown in Figs. 1 to 4 but distinguishing in the fact that the clamp bars 32' have their ends bent upwards and cooperative with a series of apertures 36' formed in the bottom faces of the track-like projections 21. In this form of the invention the compass scale must be pressed down on the work so that the stems 33 will be pressed upwards to engage the upturned ends of the clamp guards 32' in certain of the apertures 36'. This will hold the slide 14' in a fixed position without any possibility of its moving while a circle or arc is being drawn.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A scale compass, comprising a strip-like body having a slot at one end and a linear scale along one side and formed with small pencil point openings along each main linear distance on said scale, said slot being parallel to said scale, and a slide mounted in said slot and limited to move one main linear distance on said scale formed with a pencil point opening alignable with the subdivisions of the first main linear distance on said scale, and means for locking said slide against accidental shifting, including laterally disposed clamp bars mounted on said slide and having vertically projecting stems, resilient means urging said bars vertically so that said stems project beyond the bottom surface of said scale body, and said bars being engageable with teeth or serrations formed on said body when the stems are retracted by pressure of the scale body on a supporting surface to prevent shifting of said slide.

2. A scale compass, comprising a strip-like body having a slot at one end and a linear scale along one side and formed with small pencil point openings along each main linear distance on said scale, said slot being parallel to said scale, and a slide mounted in said slot and limited to move one main linear distance on said scale formed with a pencil point opening alignable with the subdivisions of the first main linear distance on said scale, and means for locking said slide against accidental shifting, including a laterally extending clamp bar mounted on said slide and having a vertically projecting stem, resilient means for urging said bar vertically so that said stem yieldably projects beyond the bottom of the body and said bar having ends engageable with cooperative elements on said body to prevent shifting of said slide.

JOSEPH F. BUDNICK.

REFERENCES CITED

The following references are of record in the file of this patent:

UNITED STATES PATENTS

| Number | Name | Date |
| --- | --- | --- |
| 1,170,174 | Matson | Feb. 1, 1916 |
| 1,808,705 | Owen | June 2, 1931 |
| 1,825,266 | Fischer | Sept. 29, 1931 |

FOREIGN PATENTS

| Number | Country | Date |
| --- | --- | --- |
| 485,372 | France | Jan. 4, 1918 |